(12) United States Patent
Maegawa

(10) Patent No.: US 8,707,358 B2
(45) Date of Patent: Apr. 22, 2014

(54) APPARATUS FOR PROVIDING METADATA OF BROADCAST PROGRAM

(75) Inventor: Tomonori Maegawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 938 days.

(21) Appl. No.: 11/798,408

(22) Filed: May 14, 2007

(65) Prior Publication Data

US 2008/0005505 A1    Jan. 3, 2008

(30) Foreign Application Priority Data

Jun. 30, 2006  (JP) ................................. 2006-182679

(51) Int. Cl.
*H04N 7/16* (2011.01)
*H04N 7/025* (2006.01)

(52) U.S. Cl.
USPC .................... 725/40; 725/51; 725/53; 725/58

(58) Field of Classification Search
USPC ......................................................... 705/26
See application file for complete search history.

(56) References Cited

U.S. PATENT DOCUMENTS

| | | | |
|---|---|---|---|
| 5,907,322 A * | 5/1999 | Kelly et al. | 725/51 |
| 6,334,114 B1 * | 12/2001 | Jacobs et al. | 705/26 |
| 6,637,028 B1 * | 10/2003 | Voyticky et al. | 725/42 |
| 2002/0004796 A1 * | 1/2002 | Vange et al. | 707/10 |
| 2002/0083464 A1 * | 6/2002 | Tomsen et al. | 725/112 |
| 2002/0178441 A1 * | 11/2002 | Hashimoto | 725/11 |
| 2004/0117831 A1 * | 6/2004 | Ellis et al. | 725/53 |
| 2006/0143683 A1 * | 6/2006 | Mampaey | 725/135 |
| 2006/0259930 A1 * | 11/2006 | Rothschild | 725/81 |
| 2007/0094690 A1 * | 4/2007 | Rodriguez et al. | 725/58 |
| 2007/0147360 A1 * | 6/2007 | Vogl et al. | 370/371 |

FOREIGN PATENT DOCUMENTS

| | | |
|---|---|---|
| JP | 2003-122662 | 4/2003 |
| JP | 2003-228498 | 8/2003 |
| JP | 2005-151148 | 6/2005 |
| JP | 2005-175850 | 6/2005 |
| JP | 2006-121301 | 5/2006 |

OTHER PUBLICATIONS

U.S. Appl. No. 09/378,533 to McKissick et al.: Specification and Drawings are enclosed.*
Notification of Reason mailed by the Japanese Patent Office on Sep. 2, 2008.

* cited by examiner

*Primary Examiner* — Vivek Srivastava
*Assistant Examiner* — Carmine Malangone
(74) *Attorney, Agent, or Firm* — Finnegan, Henderson, Farabow, Garrett & Dunner, L.L.P.

(57) ABSTRACT

A metadata providing apparatus receives a first request for requesting metadata representing a broadcast schedule of a first program to be promoted in the first receiving device. A request ID is issued to the first request, and the first request and the associated request ID are stored. A request response including the request ID is sent to the first request. When the second receiving device receives a second request requesting metadata corresponding to the request ID after metadata has been prepared in the second storing device, the relevant metadata is searched for and sent.

9 Claims, 15 Drawing Sheets

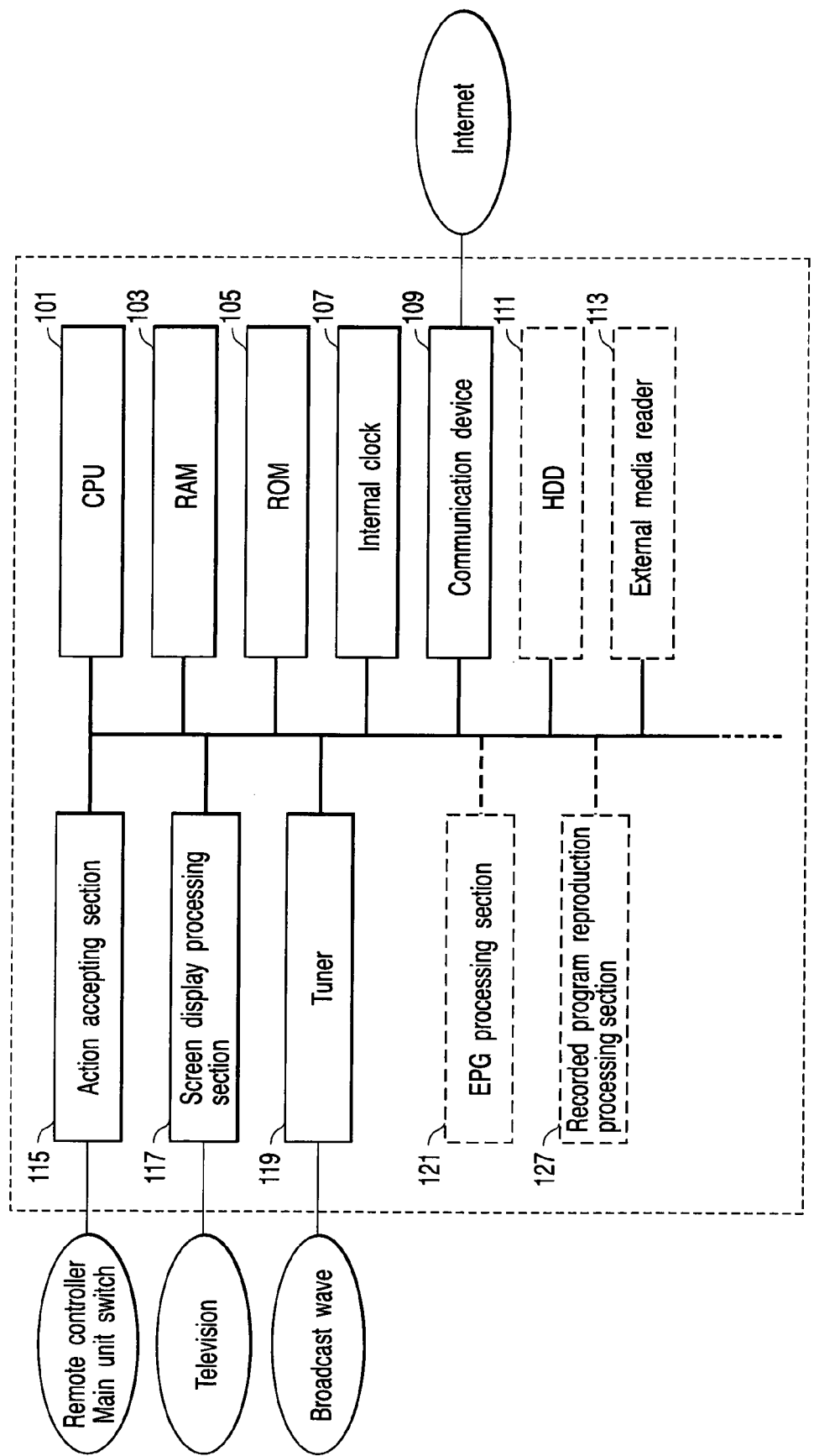
F I G. 2

| Metadata ID | Channel information of a program to be promoted | Starting date and time of a program to be promoted | Ending date and time of a program to be promoted |
|---|---|---|---|
| ... | ... | ... | ... |
| ID_XXX01 | A123-456 | 2006/02/12 20:00:00 | 2006/02/12 20:56:00 |
| ID_XXX02 | A123-456 | 2006/02/14 19:00:00 | 2006/02/14 20:00:00 |
| ... | | ... | ... |
F I G. 6

| Availability status ID | Intended channel | Intended program starting time | Intended program ending time | Availability status | Availability starting time | Availability ending time | Relevant metadata ID |
|---|---|---|---|---|---|---|---|
| ... | ... | ... | ... | ... | ... | ... | ... |
| ID_YYY010 | A123-456 | 2006/02/05 16:00:00 | 2006/02/05 16:04:59 | Non-existence of metadata determined | NULL | NULL | NULL |
| ID_YYY020 | A123-456 | 2006/02/05 16:05:00 | 2006/02/05 16:11:59 | Existence of metadata determined | Already started | 2006/02/08 23:59:59 | ID_XXX01 |
| ID_YYY030 | A123-456 | 2006/02/05 16:12:00 | 2006/02/05 18:15:29 | Non-existence or existence of metadata being investigated | 2006/02/09 00:00:00 | 2006/02/16 23:59:59 | NULL |
| ID_YYY040 | A123-456 | 2006/02/05 18:15:30 | 2006/02/05 18:15:45 | Existence of metadata determined | 2006/02/09 00:00:00 | 2006/02/16 23:59:59 | ID_XXX02 |
| ID_YYY050 | A123-456 | 2006/02/05 18:15:46 | 2006/02/05 23:59:59 | Non-existence or existence of metadata being investigated | 2006/02/09 00:00:00 | 2006/02/16 23:59:59 | NULL |
| ... | ... | ... | ... | ... | ... | ... | ... |

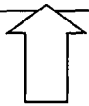

F I G. 7

| Intended channel | Intended program starting time | Intended program ending time | Availability starting time | Availability ending time | Metadata server | Relevant metadata ID |
|---|---|---|---|---|---|---|
| ⋮ | ⋮ | ⋮ | ⋮ | ⋮ | ⋮ | ⋮ |
| A123-456 | 2006/02/05 16:00:00 | 2006/02/05 16:04:59 | × | × | × | Non-existence of metadata determined |
| A123-456 | 2006/02/05 16:05:00 | 2006/02/05 16:11:59 | Now vailability | 2006/02/08 23:59:59 | localhost | ID_XXX01 |
| A123-456 | 2006/02/05 16:12:00 | 2006/02/05 16:28:29 | × | × | × | Non-existence of metadata determined |
| A123-456 | 2006/02/05 16:28:30 | 2006/02/05 16:28:59 | 2006/02/10 00:00:00 | 2006/02/15 23:59:59 | localhost | ID_XXX02 |
| ⋮ | ⋮ | ⋮ | ⋮ | ⋮ | ⋮ | ⋮ |

F I G. 8

```
<MetadataRequest>
    <Class>advertisedprogram. channelcode. datetime</Class>
    <TargetChannelCode>A001-0008</TargetChannelCode>  ~80
    <TargetDatetime>BEFORE_00:00:07</TargetDatetime> ~81
</MetadataRequest>

<MetadataRequest>
    <Class>advertisedprogram. epgitem. frametime</Class>
    <EPGItem provider="epg. toshiba. co. jp">
       ID_20060203210000_FUJI-TV
    </EPGItem>
    <TargetFrame>P00:05:30</TargetFrame>
</MetadataRequest>
```

FIG. 10

```
<MetadataRequestResponse>
    <RequestResult>Success</RequestResult>  ~120
    <RequestID>XXXXXXXXXX</RequestID> ~121
    <ServerURI>
        http://metadataserver. toshiba. co. jp/
    </ServerURI>
    <MetadataAvailableTimeRange> ~122
        2006-02-10T00:00:00JST/2006-02-17T23:59:59JST
    </MetadataAvailableTimeRange>
    <RequestAvailableTimeRange>
        2006-02-09T00:00:00JST/2006-03-31T23:59:59JST
    </RequestAvailableTimeRange>
</MetadataRequestResponse>
```

FIG. 12

Metadata request DB

| Request ID | Intended date and time | Intended channel | User action | Request processing status |
|---|---|---|---|---|
| XXXXX01 | 2006 / 02 / 08 21:05:15 | A123-456 | Previewed program | Meta data reception completed |
| XXXXX02 | 2006 / 02 / 08 21:05:12 | A123-456 | Previewed program | Meta data reception completed |
| XXXXX03 | 2006 / 02 / 08 21:05:16 | A123-456 | Previewed program | Meta data reception uncompleted |
| XXXXX04 | 2006 / 02 / 08 21:05:20 | A123-456 | Previewed program | Transmission error |
| XXXXX05 | 2006 / 02 / 08 21:05:40 | A123-456 | Next on-air | Meta data reception completed |
| XXXXX06 | 2006 / 02 / 08 21:05:15 | A123-456 | Previewed program | Meta data reception completed |
| XXXXX07 | 2006 / 02 / 09 16:55:30 | A012-345 | Next on-air | Wait for metadata availability |
| XXXXX08 | 2006 / 02 / 09 16:55:32 | A012-345 | Next on-air | Wait for metadata availability |
| XXXXX09 | 2006 / 02 / 09 16:55:29 | A012-345 | All relevant programs | Wait for metadata availability |

F I G. 1 1

```
<MetadataSearch>
    <RequestID>XXXXXXXXXX</RequestID>  ~140
</MetadataSearch>
```
FIG. 14

```
<MetadataRequestResponse>
    <RequestResult>Success</RequestResult>
    <RequestID>XXXXXXXXXX</RequestID>
    <MetadataList>
        <Metadata id="XXXX">
            <title>Monday 9 p.m. Drama-DetectiveOO<title>
            <StartDateTime>2006-02-13T21:00:00JST</StartDate Time>
            <EndDateTime>2006-02-13T22:00:00JST</EndDate Time>
            <ChannelCode>A010-008</ChannelCode>
        </Metadata>
    </MetadataList>
</MetadataRequestResponse>
```
{150}

FIG. 15

```
<MetadataSearchResponse>
    <RequestResult>Error:MetadataNotAvailable</RequestResult>  ~160
    <RequestID>XXXXXXXXXX</RequestID>  ~161
    <ServerURI>  ~162
        http://metadataserver.toshiba.co.jp/
    </ServerURI>
    <MetadataAvailableTimeRange>  ~163
        2006-02-10T00:00:00JST/2006-02-17T23:59:59JST
    </MetadataAvailableTimeRange>
    <RequestAvailableTimeRange>
        2006-02-09T00:00:00JST/2006-03-31T23:59:59JST
    </RequestAvailableTimeRange>
</MetadataSearchResponse>
```
FIG. 16

```
<MetadataSearchResponse>
    <RequestResult>Error:InvalidRequestID</RequestResult>
    <RequestID>XXXXXXXXXX</RequestID>
</MetadataSearchResponse>
```
F I G. 1 7
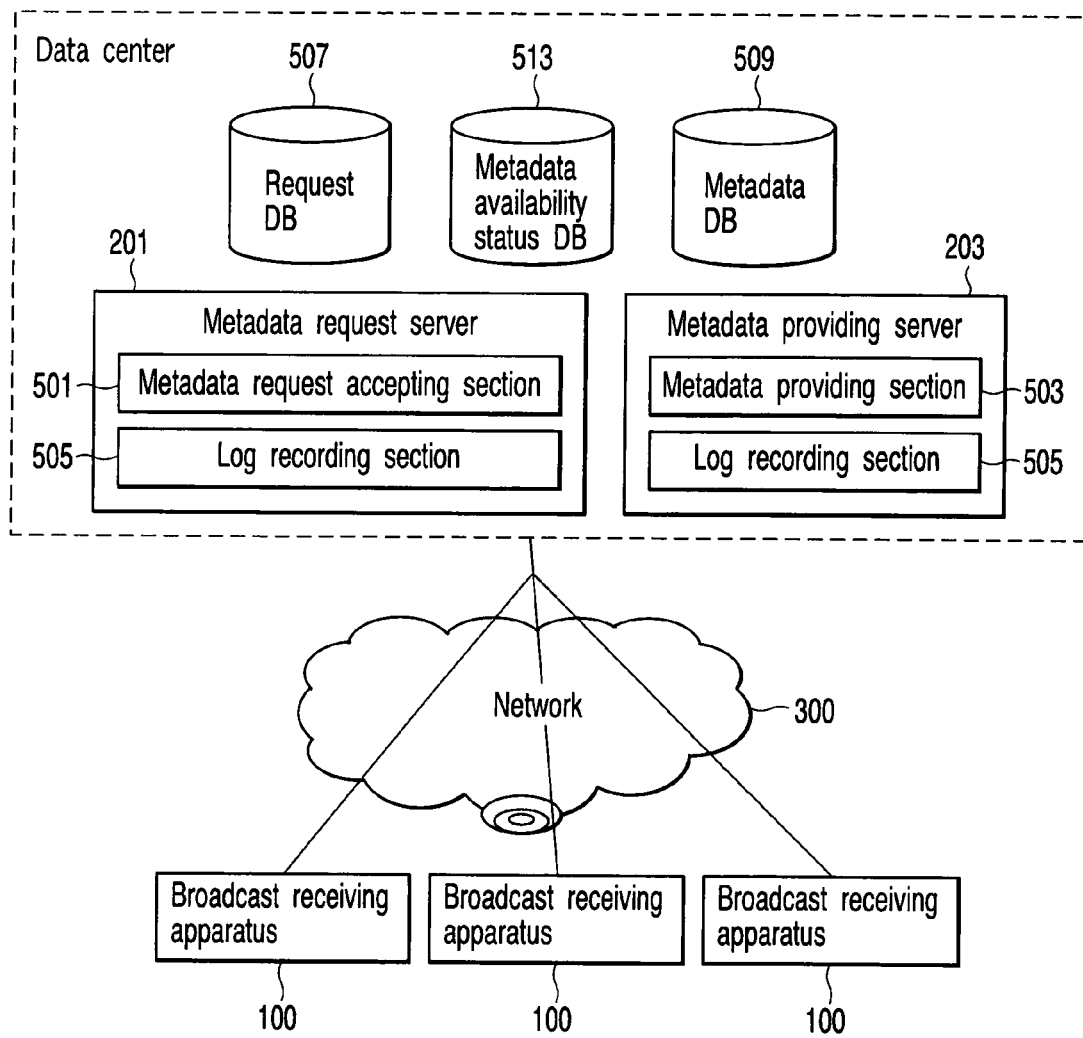
F I G. 1 8

APPARATUS FOR PROVIDING METADATA OF BROADCAST PROGRAM

CROSS-REFERENCE TO RELATED APPLICATIONS

This application is based upon and claims the benefit of priority from prior Japanese Patent Application No. 2006-182679, filed Jun. 30, 2006, the entire contents of which are incorporated herein by reference.

BACKGROUND OF THE INVENTION

1. Field of the Invention

The present invention relates to an apparatus for providing metadata of broadcast program via a network.

2. Description of the Related Art

Television companies are frequently broadcasting commercial messages (CMs) for program promotion in order to increase reception of new and special programs. The audience ratings of the programs themselves can be investigated by means of an existing examination system; however, the effectiveness of such commercial messages leading to actual reception of the programs cannot be examined thereby. So, the examination of the effectiveness of the commercial messages on a case-by-case basis by means of a questionnaire survey or the like requires a very high cost. Thus, a new service such as expressing program preview information as metadata of a program, distributing the data via Internet and a broadcast wave, and utilizing it between a broadcasting receiving apparatus and a distribution server is considered to become more and more active in the future.

In recent years it is desired to realize a highly user-friendly service function taking advantage of the metadata of the program information as described above for satisfying service subscribers' needs, which are ever-increasingly advanced and diversified. For this purpose, high-quality metadata should be created, thus resulting in high costs and much time. However, in the present state of metadata providing services, the thinking is that "metadata should be available free of charge", thus there is no system that can recover the cost for providing metadata.

As a technology for making metadata available, a technology for detecting an operation of a program being received conducted by a user and acquiring related information (metadata) from a server (program information DB) other than a server distributing the EPG (Electronic Program Guide) is described, for example, in JP-A 2005-175850 (KOKAI). The program information DB accumulates not only the program-related information contents themselves as information concerning any portion of a program, but also references such as a URL and URI for searching for related information on a predetermined information space such as the Internet, resource identification information, and keywords.

A TV receiver having a function for sending viewing information outside is also known (for example, refer to JP-A 2005-151148 (KOKAI). Since this receiver can send not only viewing information, but also operation information at the time of program timer-recording, the program timer-recording rate or the like can be analyzed from outside. In this Document, it is described to send analyzed data regularly to a server.

With a developing program timer-recording function in the broadcast receiver, it is desired to rapidly realize a service for providing metadata concerning program information. For example, no function of timer-recording a main broadcast program by means of one-click operation of a user in an early stage in which the EPG information of the main broadcast program to be promoted has not been distributed when receiving a "program promotion program" in the broadcasting has been realized until now.

BRIEF SUMMARY OF THE INVENTION

According to one aspect of the present invention, there is provided a metadata providing apparatus comprising a first receiving device configured to receive a first request for requesting metadata representing a broadcast schedule of a first program to be promoted; an issuing device configured to issue a request ID with respect to the first request; a first storage to store the first request and the associated request ID; a first sending device configured to send a request response including the request ID in response to the first request; a second storage device to store metadata; a second receiving device configured to receive a second request including the request ID and requesting metadata corresponding to the request ID; and a second sending device configured to search the second storing device for metadata which is relevant to the request ID included in the second request, and send such metadata.

BRIEF DESCRIPTION OF THE SEVERAL VIEWS OF THE DRAWING

FIG. 2 is a view showing a hardware configuration of a broadcast receiving apparatus;

FIG. 6 is a view showing a record in a metadata DB;

FIG. 7 is a view showing information of a relationship between the metadata and the program broadcast slots;

FIG. 8 is a view showing a metadata availability status DB;

FIG. 10 is a view showing the format of a metadata request;

FIG. 11 is a view showing a table for storing the metadata request;

FIG. 12 is a view showing a metadata request response;

FIG. 14 is a view showing a metadata availability request message;

FIG. 15 is a view showing a response message (response) from the metadata server;

FIG. 16 is a view showing another response;

FIG. 17 is a view showing a further response;

FIG. 18 is a view showing a data center according to a third embodiment;

DETAILED DESCRIPTION OF THE INVENTION

First Embodiment

Figure 1:
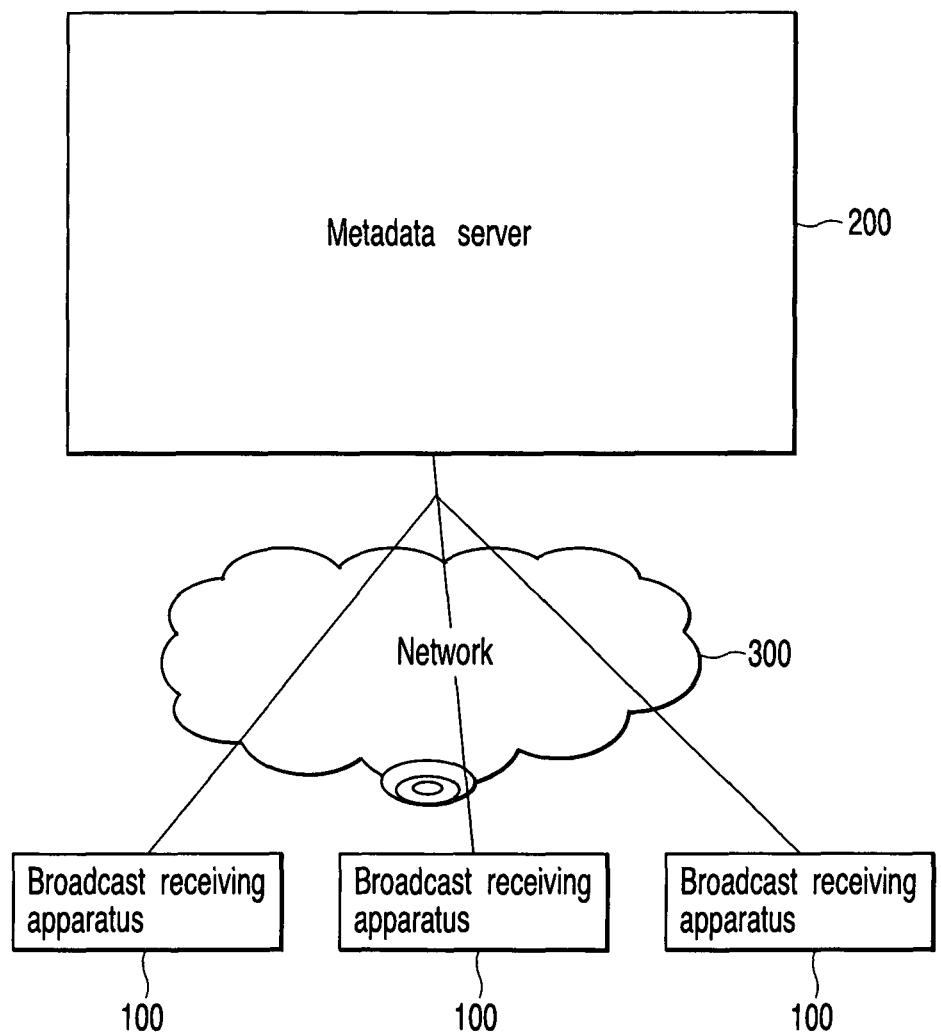
FIG. 1 is a view showing a metadata providing system according to a first embodiment.

As shown in FIG. 1, in the metadata providing system, a metadata server 200 provides metadata to a plurality of broadcast receiving apparatuses 100 connected to a network 300 such as the Internet via the network 300.

(Broadcast Receiving Apparatus 100)

As shown in FIG. 2, the broadcast receiving apparatus 100 includes a CPU 101 for controlling each of the sections and performing operations; a RAM 103 for storing a program and data temporarily; a ROM 105 for storing a program; an internal clock 107 for acquiring current time; a communication device 109 for communicating with an external network 300 such as Internet; an action accepting section 115 for accepting user's inputs by means of a remote controller or a main unit button; a screen display processing section 117 for displaying received broadcast and various user information; and a tuner 119 for receiving analogue broadcast wave or digital broadcast wave from an antenna, CATV, IP network or the like.

In addition to a basic TV-receiving function of processing display for outputting information received by means of the tuner 119 to a television or the like, the broadcast receiving apparatus 100 has a function for timer-recording of an on-air scheduled broadcast program by means of the EPG, a function for reproducing a recorded program, and a function for reproducing external media such as a DVD and the like. For this purpose, the broadcast receiving apparatus 100 is provided with an HDD (hard disk device) 111, an external media reader 113, an EPG processing section 121, and a recorded program reproduction processing section 127.

Further, the broadcast receiving apparatus 100 has a function for accepting an action of a user for one scene in the program being viewed, sending the information of the user's action as a metadata request to the metadata providing server 200 via Internet 300 and receiving metadata, as well as a function for interpreting and utilizing the received metadata. For example, the action is an operation input by means of which a user viewing the program promotion program gives an instruction of timer-recording the program to be promoted ("preview recording" described later). The metadata received from the metadata providing server 200 based on the instruction is EPG information (for example, an EPG identifier) used for performing a timer-recording processing on the relevant program presented after the completion of the program promotion program in the EPG processing section 121. For a configuration example having no EPG recording function, the metadata received from the metadata providing server 200 is information used for performing a timer-recording processing on the relevant program in another timer-recording processing section, for example, information representing a channel for timer-recording, recording date and time, and recording duration time.

(Metadata Server 200)

Figure 3:
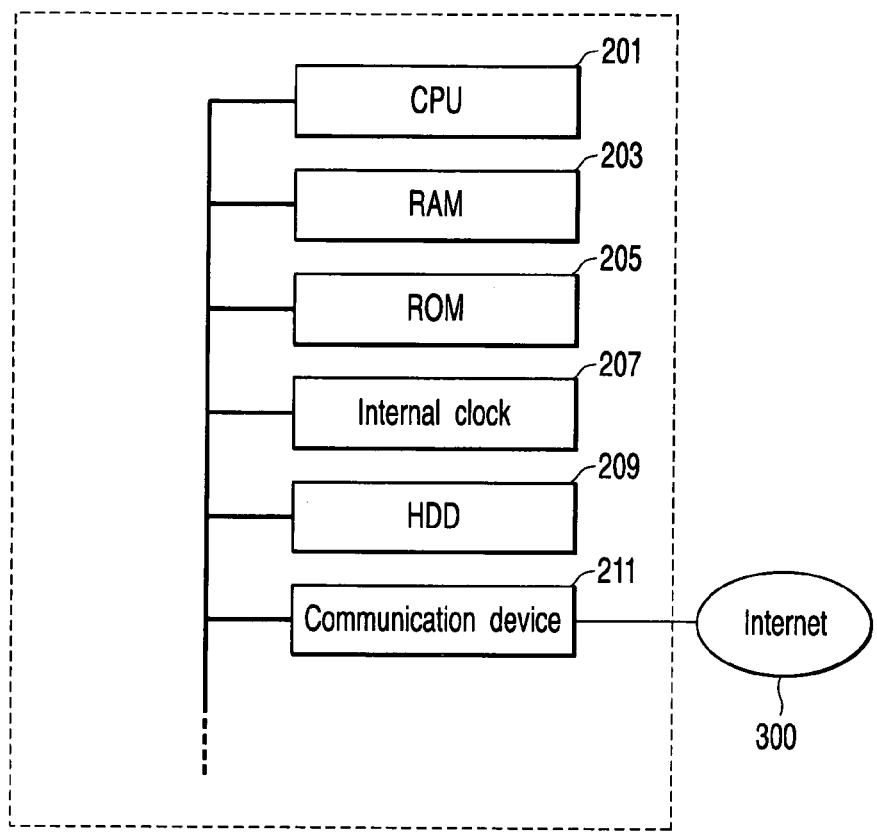
FIG. 3 is a view showing a hardware configuration of a metadata server.

As shown in FIG. 3, the metadata server 200 includes a CPU 201 for controlling each of the sections and performing operations; a RAM 203 for storing a program and data temporarily; a ROM 205 for storing a program; an internal clock 207 for acquiring current time; a communication device 211 for communicating with an external network 300; and a HDD 209 for storing various databases and application programs.

Figure 4:
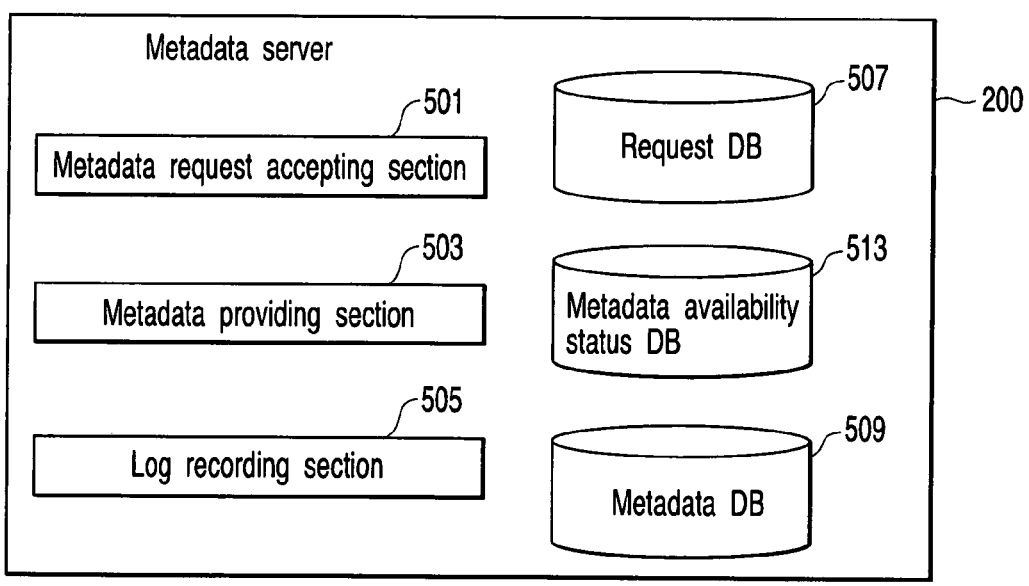
FIG. 4 is a view showing a software configuration operating on the metadata server.

As shown in FIG. 4, a software application located on the metadata server 200 includes a metadata availability status DB 513 for storing the availability status of metadata for a program broadcasting slot; a metadata request accepting section 501 for performing a processing of receiving a metadata request from the broadcast receiving apparatus 100; a metadata request DB 507 for storing the accepted metadata request; a metadata providing section 503 for receiving a metadata acquisition request from the broadcast receiving apparatus 100 to which a request ID of the metadata request has been issued and providing actual metadata; a metadata DB 509 for storing the available metadata; and a log recording section 50 for recording a series of these processing contents with the processing times.

Now, the information received and sent between the broadcast receiving apparatus 100 and the metadata server 200 for accepting a metadata request in the first embodiment will be described.

(Metadata DB and Metadata Availability Status DB)

Figure 5:
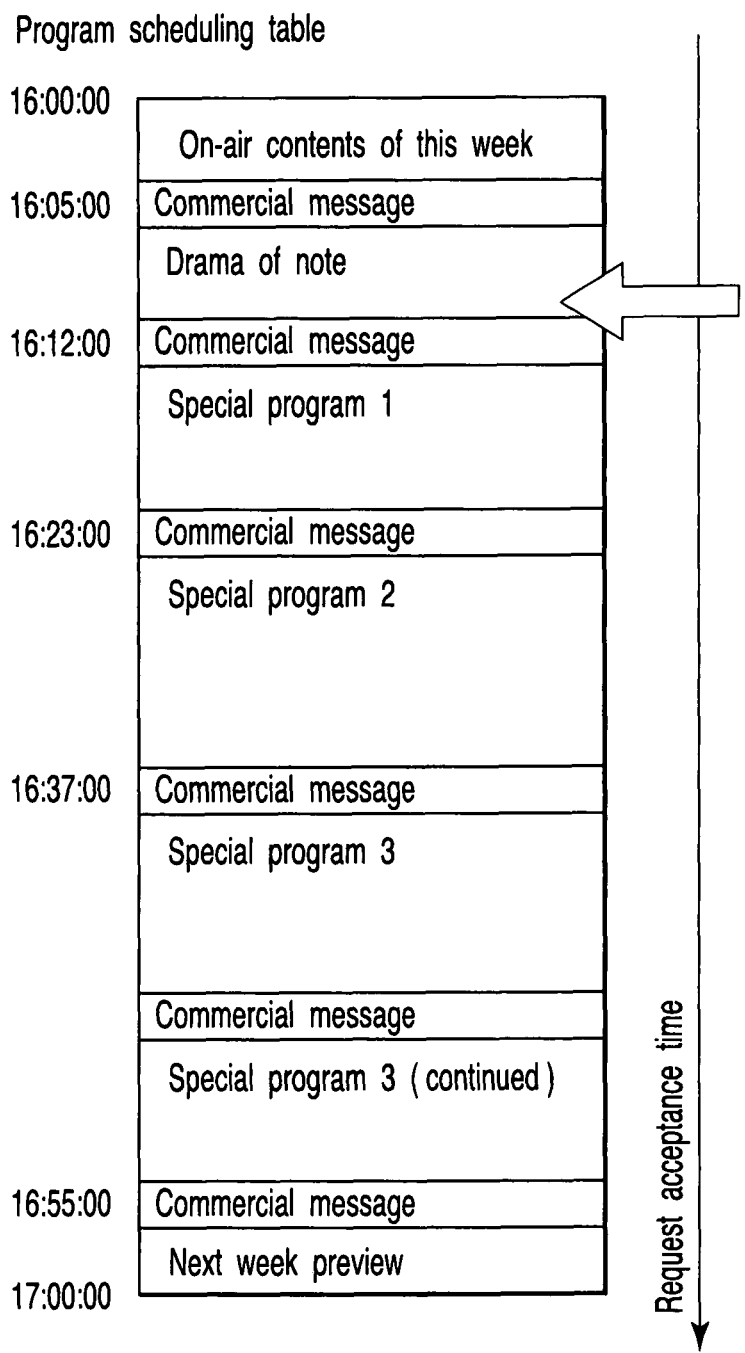
FIG. 5 is a view showing a relationship between the description contents of metadata and the program scheduling table.

As shown in FIG. 5, the program scheduling table is composed for each channel along the time axis. For a live program, the program composition is fixed only after having broadcasted the program. However, for a non-live program, the program composition can be fixed even before broadcasting the program. As can be seen from the program scheduling table shown in FIG. 5, there is a program promotion slot entitled "Drama of note" between 16:05:00 to 16:12:00. For this program promotion, a record in the metadata DB 509 as shown in FIG. 6 (here, a record having a metadata ID of ID_XXX01) and the information relevant to the program broadcasting slot of the metadata stored in the metadata availability DB as shown in FIG. 7 (here, a record having an availability status ID of ID_YYY020) are stored, thereby enabling the metadata for a particular broadcasting slot in the program scheduling table to be identified.

The data stored in the metadata DB 509 is hereinafter referred to as "metadata of program scheduling information". For example, when the metadata is the information of a program to be promoted in the program scheduling information, each record in the metadata DB 509 is configured to include metadata ID, channel information for a program to be promoted, starting time of a program to be promoted and ending time of a program to be promoted as essential columns. The correspondence relationship between the program scheduling information and the metadata is maintained in the metadata availability status DB 513.

Such metadata is supplied from metadata creators and accumulated in the metadata DB 509 of the metadata server 200.

The metadata availability status is stored in the metadata availability status DB 513 aggregating information whether metadata is available or not for a program promotion broadcasting slot as shown in FIG. 7. In this metadata availability status DB 513 there are registered two kinds of information, that is, a slot in which availability of metadata is determined and a slot in which no availability of metadata is determined. More specifically, when creating metadata for each scene of a program promotion program, not only metadata and scenes are simply associated with each other, but also scenes having no association with metadata are determined, thereby realizing creation of metadata in such a manner as to demonstrate the existence or non-existence of metadata clearly throughout the program promotion scheduling.

In addition, in the metadata availability status DB 513 shown in FIG. 7, no slots in which the availability of metadata is not definitely determined are stored. For such slots, the policy of available time range is predetermined in the metadata providing section 503 and information, for example, such as "in three days available", is sent back to the broadcast receiving apparatus 100.

(Normal Viewing State)

The screen display processing section 117 accepts an operation of a user by means of a remote controller or a main unit button at the action accepting section 115 and displays received images of the tuner 119 by the control of the CPU 101 processing the operation. Here, the tuner 119 is not limited to one for TV broadcasting, and tuners for broadcasting via broadcasting waves such as radio broadcasting and data broadcasting and for broadcasting via a network such as Internet streaming may be included. Here, the example of TV broadcasting will be described.

(Acceptance of User Actions and Responses Thereto)

In addition to usual TV operations such as channel switching and volume control, a user can give an instruction of desiring to timer-record a previewed program to the broadcast receiving apparatus 100 via the action accepting section 115 by pushing on a dedicated "preview recording" button provided on the remote controller when viewing preview scenes during TV viewing. According to this instruction, the broadcast receiving apparatus 100 acquires the date and time of the operation action from the internal clock 107, acquires the information of the channel being viewed from the tuner 119 and stores the information as the elements of the metadata request.

In addition to reserving timer-recording of a previewed program, actions may include information associated between the scenes being viewed and the program to be broadcasted in the future such as a bookmark for timer-recording a previewed program, viewing reservation of a previewed program in a broadcast receiving apparatus 100 having no recording function, a bookmark for viewing a previewed program in a broadcast receiving apparatus 100 having an all-channel recording function, and a bookmark for refusal of viewing a previewed program.

The previewed program described here may of course include not only a "program" as a unit managed in the EPG, but also one "part" or "scene" in one program. Further, it goes without saying that this can be applied to any information which can be displayed on the TV screen such as desired more detailed commentary information about scenes and a program being viewed. For the configuration of the remote controller buttons, a dedicated button may be provided for each of slots and scenes, or the kinds of actions may be asked by means of dialog displays on the screen with only one button provided in the remote controller.

Moreover, preview scenes may include not only a next series program preview just before the end of the current series program, but also one scene in a program having only a content of program promotion, as well as a reference scene and an introduction scene in a program having a content of an audience rating of programs or a ranking of theme songs.

The kinds of targeted metadata depend substantially on the kinds of actions. However, for example, a user action may be an abstract instruction such as "all the programs relating to this scene". In such a case metadata is searched according to the abstract instruction on the metadata server 200 side. Further, if the broadcast receiving apparatus 100 gives an instruction "metadata of next on-air program" as an action when preview scenes of another program is being broadcasted in a program promotion program, the metadata server 200 does not try to search the metadata of a previewed program of the relevant scenes, but the metadata of the next on-air program promotion program including the relevant scenes. In this manner, the metadata server 200 suitably takes advantage of different kinds of user actions.

At the time of accepting a user action, the operability and visibility of users may be improved by displaying a message that the action has been accepted or a message asking whether the action may be processed or not in the main unit LED or on the viewing screen.

Moreover, the broadcast receiving apparatus 100 preferably has a function for displaying that the request of the user has been once accepted on the screen in consideration of the time lag between metadata request processing and metadata acquisition processing to indicate the result of the processing later by LED or on the viewing screen, or a function of enabling the list of the user action history to be managed and to be browsed full-time by a user operation. Further, the processing of the series of user actions described above may be replaced by the determination of a suitable automatic processing program.

(Metadata Request Registration)

Figure 9:
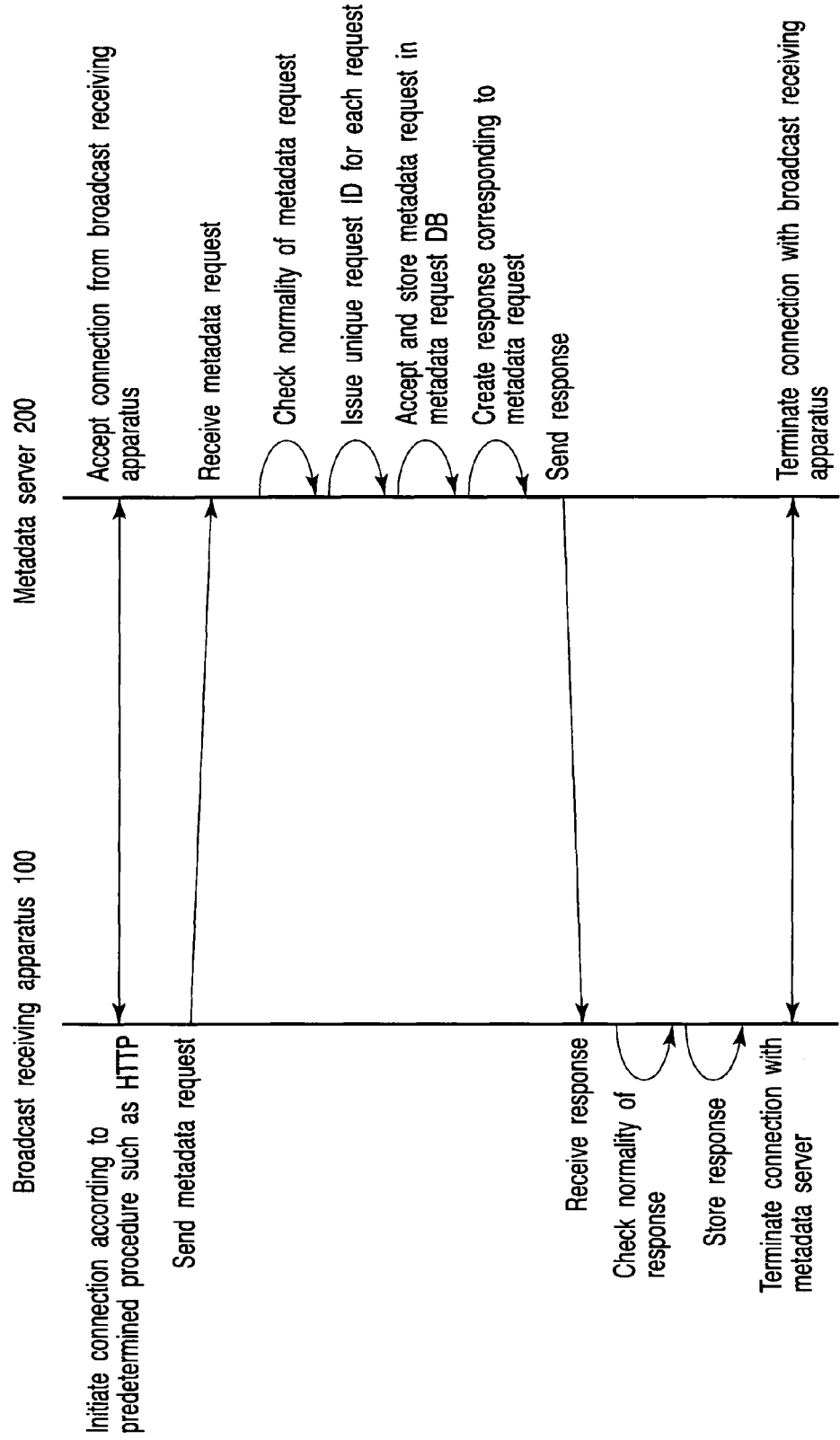
FIG. 9 is a view showing a procedure of accepting a metadata request.

With reference to FIG. 9, the procedure of accepting a metadata request from the broadcast receiving apparatus 100 in the metadata server 200 will be described.

After the processing in the action accepting apparatus 115, using the communication device 109, communication is performed with the metadata server 200 via the Internet by the control of the CPU 101. As a message transfer protocol used for sending/receiving a metadata request to/from the metadata server 200, a predetermined one, for example, HTTP or SMTP, is used.

The broadcast receiving apparatus 100 creates a metadata request including a combination (equivalent to a search key) of the date and time and the viewing channel of the broadcast receiving apparatus 100 at the time of the action operation stored in the action accepting section 115 to send the metadata request to the metadata server 200.

The date and time in the metadata request shown in FIG. 10 is preferably described together with a time zone in consideration of a possible geographical difference between the broadcast receiving apparatus 100 and the metadata server 200. As a format, for example, one specified in ISO 8601 is conceivable.

The viewing channel 80 in the metadata request is described by using a format predetermined between the broadcast receiving apparatus 100 and the metadata server 200 and selected from a combination of zip code, long-distance code and received channel code, an area-identifiable unified code such as the DEPG code, or the like.

For the date and time information 81 at the time of an action operation, "processing delay" from action operation point to metadata request delivery is measured, the delay time is transmitted to the metadata server 200, and the clock time obtained by subtracting the processing delay time from the time of receipt on the metadata server 200 side is used as the date and time of the action operation. Further, if the processing delay is negligible, the "time of receipt" on the metadata server 200 side may be simply used as the date and time of the action operation. In this method the current clock time of the broadcast receiving apparatus 100 may not necessarily be correct.

When the clock time of the internal clock 107 of the broadcast receiving apparatus 100 can be set to the exact time in advance by means of the NTP or time tone service, the date and time information at the time of the operation obtained from the internal clock of the broadcast receiving apparatus 100 may be of course used. In any case, a format predetermined on the metadata server 200 side is used.

Then, when having received a metadata request, the metadata server 200 checks the normality of the metadata request first. The "normality" here described means a description format of the metadata request and the range of a value. If the metadata request does not satisfy the normality, the metadata server 200 sends an error message that the normality of the metadata request is suspicious to the broadcast receiving apparatus 100 and terminates the connection.

If the metadata request satisfies the normality, a unique request ID is issued for each metadata request. As the format of this ID, for example, a Message ID of SMTP or an identification number of current clock time+broadcast receiving apparatus 100 is conceivable.

Then, the metadata server 200 stores the metadata request together with this request ID in the metadata request DB 507. A metadata request sent from the broadcast receiving apparatus 100 is stored, for example, in a table as shown in FIG. 11.

After having completed a series of metadata request accepting processings, the metadata server 200 creates a metadata request response as shown in FIG. 12 and sends it to the broadcast receiving apparatus 100.

The metadata request response includes a result code "<RequestResult>" 120 indicating whether the metadata request is right or wrong and a metadata request ID "<RequestID>" 121 created in the metadata server 200.

Moreover, for the available time range of metadata "<MetadataAvailableTimeRange" 122, a response is sent according to information in the metadata availability status DB 513. For example, when the available metadata has been already prepared, immediate availability of metadata is indicated by displaying the available time range as "NOW". In addition, the available time range of metadata may be altered later, and as a result thereof, no metadata may be available in the relevant time range. In this case, no metadata may possibly be available at the time of metadata acquisition, and the processing procedure thereof will be described later.

Moreover, when the available time range of metadata is not known from the metadata availability status DB 513, for example, a value such as "in three days to one week" is predetermined as a default value on the metadata server 200 side and the value is mechanically sent back.

If any processing error occurs in this period in the metadata server 200, a message indicating the content of the error is sent to the broadcast receiving apparatus 100, and the connection is terminated.

When receiving a metadata request response, the broadcast receiving apparatus 100 checks the normality thereof, and if there are no problems, the response is stored in a nonvolatile storage device (not shown).

After having completed the series of processings, the broadcast receiving apparatus 100 and the metadata server 200 terminate the connection according to a predetermined procedure.

Preferably, the broadcast receiving apparatus 100 compares a specified metadata available time range and the current clock time with each other in the stored metadata request response and informs the result thereof to the user by means of a massage corresponding to the difference thereof. This message may be "Metadata acquisition is started" when immediate data acquisition is possible or may be "Request is stored" or "Request is fixed in one week" when metadata acquisition is possible in one week.

(Metadata Acquisition)

Figure 13:
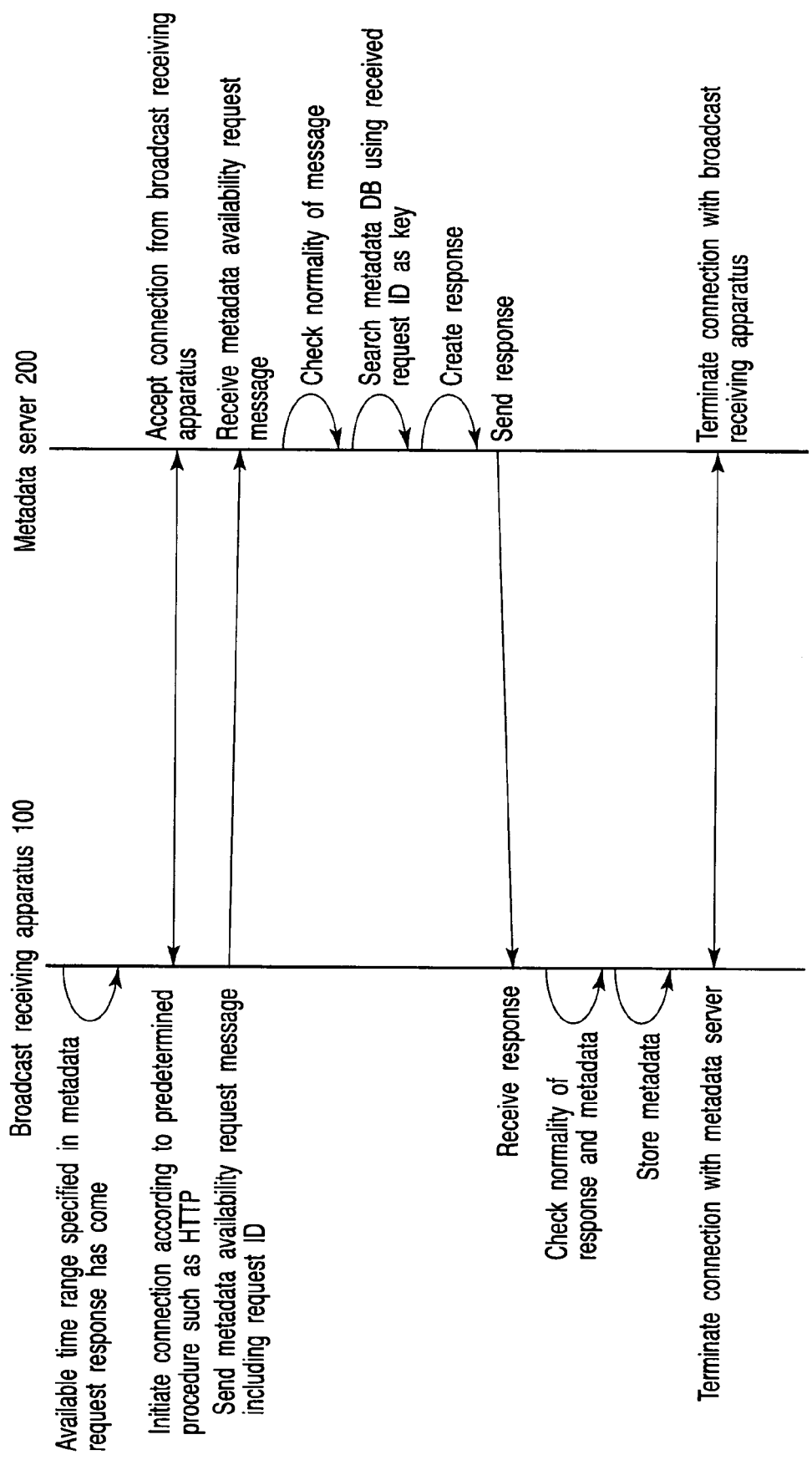
FIG. 13 is a view showing a procedure in which the broadcast receiving apparatus receives metadata from the metadata server.

FIG. 13 shows a procedure in which the broadcast receiving apparatus 100 receives metadata from the metadata server 200.

The broadcast receiving apparatus 100 tries to acquire metadata in the metadata available time range based on the information specified in the already obtained metadata request response.

For a problem when during the metadata available time range the data acquisition is to be performed, the metadata server 200 side preferably gives variations in advance in the available time range to be sent back from the view of load distribution, thereby enabling the broadcast receiving apparatus 100 to try the acquisition of metadata rapidly after the starting time of the available time range has come.

When acquiring metadata, first, a connection to a URI of the metadata server 200 specified in the metadata request response is started according to a predetermined procedure. The broadcast receiving apparatus 100 sends a message of a request for providing metadata corresponding to the request ID to the metadata server 200.

When having received a message of request for providing metadata as shown in FIG. 14, the metadata server 200 checks the normality thereof. If the normality of the message of the request for providing metadata has been identified, the metadata DB 509 is searched, using a request ID 140 included in the message as a search key. If the relevant metadata is hit, the metadata server 200 sends back a code indicating a successful search and the metadata thereof to the broadcast receiving apparatus 100.

When having received a response message from the metadata server 200 as shown in FIG. 15, the broadcast receiving apparatus 100 checks the normality thereof. If the normality has been identified, the broadcast receiving apparatus 100 stores metadata 150 included in the message. When this series of processings have been completed, the broadcast receiving apparatus 100 and the metadata server 200 terminate the connection.

An example of a message sent back in a case of an unsuccessful search of the metadata DB 509 is shown in FIG. 16.

If the relevant metadata is not hit, however, when it is known that the metadata availability status DB 513 is available by using other methods, such as that the metadata is available again later or by accessing to another metadata server, a response including a code 160 indicating that there are alternatives in spite of an unsuccessful search, a request ID 161, a URI 162 of another metadata server to be accessed next time and a metadata time range 163 to be accessed next time is created and sent back to the broadcast receiving apparatus 100.

When having received a response of correction from the metadata server 200, the broadcast receiving apparatus 100 checks the normality thereof, and as in the metadata request processings, it performs metadata acquisition scheduling again. When this series of processings have been completed, the broadcast receiving apparatus 100 and the metadata server 200 terminate the connection.

If the relevant metadata is not hit, and when it is known according to the metadata availability DB 513 that the metadata is unavailable, a code indicating that "the search is unsuccessful and that there are no alternatives" and a response including the request ID are created and sent back to the broadcast receiving apparatus 100. An example of this response is shown in FIG. 17.

When having received a response of impossible search from the metadata server 200, the broadcast receiving apparatus 100 checks the normality thereof. As a result thereof, for the relevant metadata request, it is determined that the relevant metadata cannot be acquired and an exceptional processing is performed. When this series of processings have been completed, the broadcast receiving apparatus 100 and the metadata server 200 terminate the connection.

As described above, a time difference can be given between the acceptance point of the metadata request and the availability point of the metadata. That is, the metadata can be provided to the initial metadata request asynchronously. Therefore, metadata suppliers may provide metadata by means of a method in which no metadata is prepared in advance. If metadata is available at the acceptance point of the metadata request, this apparatus can realize immediate availability of metadata by setting the metadata available time range to "Immediate" or "NOW".

Second Embodiment

The second embodiment relates to timer-recording in viewing a recorded program promotion program. A method for obtaining similar advantages as in the first embodiment will be described.

The screen display processing section 117 accepts an operation of a user by means of a remote controller or a main unit button at the action accepting section 115 and displays received images of the recorded program reproduction processing section 127 by the control of the CPU 101 processing the operation.

(Acceptance of User Actions and Responses Thereto)

By pushing a dedicated "preview recording" button provided on the remote controller when viewing preview scenes during reproduced program viewing, a user can give an instruction of desiring to timer-record a previewed program to the broadcast receiving apparatus 100 via the action accepting section 115.

According to this instruction, the broadcast receiving apparatus 100 acquires the on-air date and time and the channel information of the scene being viewed from the recorded program reproduction processing section 127 and stores them as a search key for sending a metadata request.

The on-air date and time of the scene being viewed is calculated, for example, from "on-air starting time of the reproduced program"+"time period from the start of the program to the viewed scene".

The actual on-air date and time of the relevant scene is obtained in this manner, enabling similar advantages to be obtained by performing a similar procedure as in the first embodiment for a metadata request registration procedure or a metadata acquisition procedure.

Third Embodiment

The third embodiment related to a configuration realizing metadata request acceptance and metadata availability by means of separate servers.

As shown in FIG. 18, a data center includes a request DB 507; a metadata availability status DB 513; and a metadata DB 509 as well as a metadata server 201 and a metadata providing server 203 capable of accessing to these DBs. This configuration enables the distribution processing of load of each process by means of a plurality of hardware. In addition, the metadata DB 509 can be configured by groups such as by on-air areas, by user groups or by broadcasting stations, thereby enabling a more effective metadata management.

In such a configuration, the metadata request from each broadcast receiving apparatus 100 is sent to the metadata request server 201. In the response at that time, by selecting the information of the metadata providing server 203 to be used by each broadcast receiving apparatus 100 from a usable metadata providing server group and noticing the information by means of a round-robin method or the like, each broadcast receiving apparatus 100 can access to the metadata providing server 203 with a suitably distributed timing, thereby enabling a distributed load of metadata search processing.

In addition, there is also a method in which the metadata request server 201 is constructed for each area, and the URL of the metadata request server 201 which is to send a request is used properly for each on-air area in each broadcast receiving apparatus 100, thereby enabling the broadcast receiving apparatus 100 side to take advantage of viewing channel information limited to a specified area and to perform a metadata request. In this case, by comprehending a channel code in consideration of the area characteristics in the metadata request server group, the metadata providing servers 203 may be reduced to one in number. Alternatively, a metadata search server may be provided for each area.

Also, in the configuration in which the request server and the search server are separated from each other, similar advantages as in the first embodiment can be obtained.

Fourth Embodiment

Figure 19:
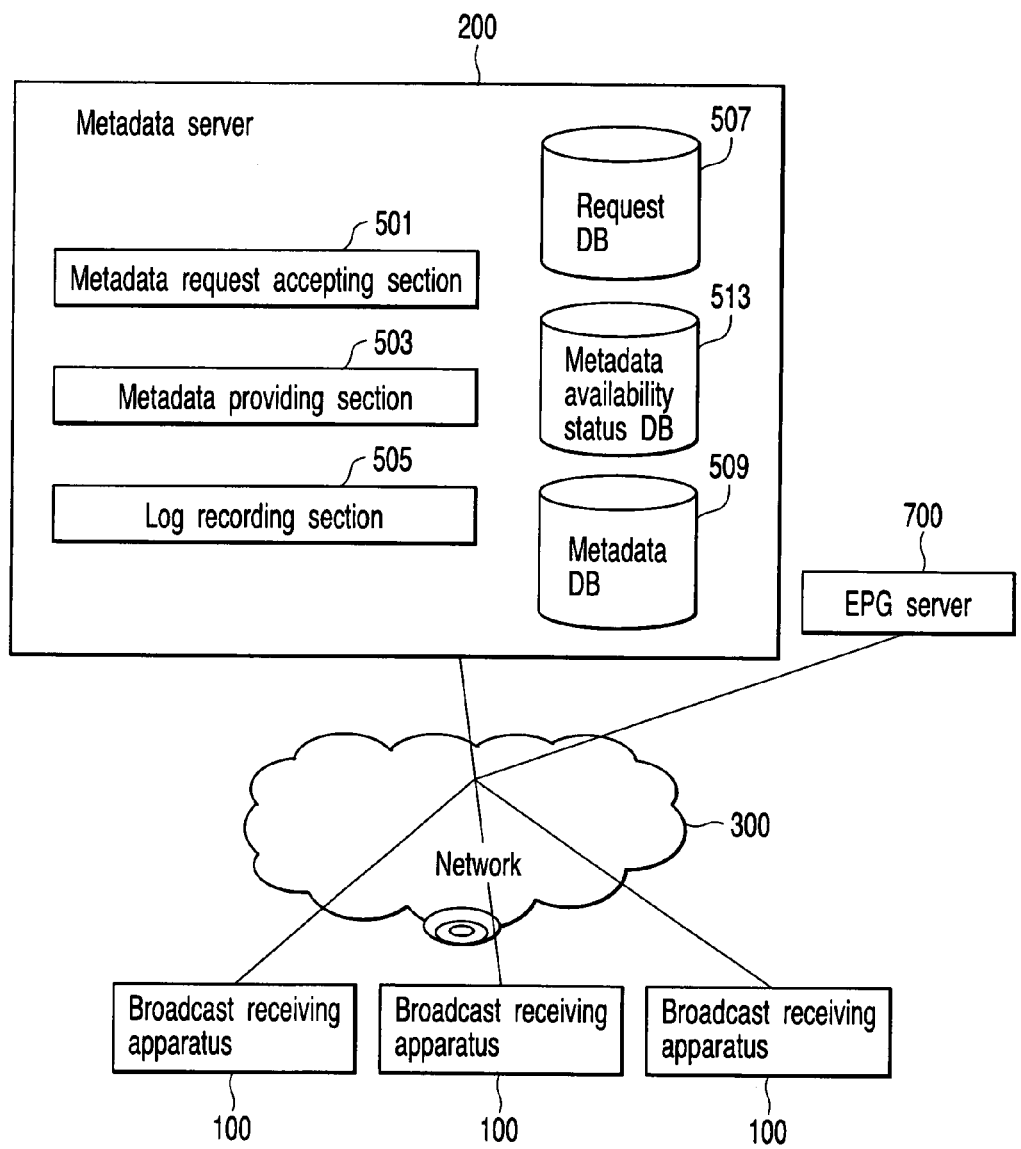
FIG. 19 is a view showing cooperation with an EPG server according to a fourth embodiment.

The fourth embodiment relates to interconnection with the EPG server. FIG. 19 shows a configuration in which the metadata server 200 and the EPG server 700 are interconnected. The EPG is an electronic program guide and provides electronically a program scheduling table for a certain period of time, such as from now to one week later. The broadcast receiving apparatus 100 can display this EPG information on the screen via the Internet or broadcast wave and a user can use it. In this EPG information, a schedule is managed program by program, and therefore, a user can know when a certain program is on-air, and can customize or expand processings in the different sections of the metadata server 200.

First, in the phase of registering a metadata request, the broadcast receiving apparatus 100 and the metadata server 200 are enabled to reference the same EPG, thereby allowing a particular scene to be identified by means of "program identifier"+"viewing time position". Since the management of the starting time of a program can be entrusted to the EPG, a relative specification, such as identification of a certain scene associated with a viewing time position in the program, is possible. For example, even if one area has a different program starting time from another area, the same viewing scene can be identified in the same viewing time position. As a result thereof, data management of the metadata DB 509 and the metadata availability status DB 513 can be facilitated. In addition, interconnection with the information updating function of the EPG is realized, which enables temporarily changed program scheduling, such as in the case of an extended sport program, for example.

Moreover, for a recorded program promotion program, the "program identifier" thereof is stored, thereby enabling identification of a certain viewing scene by means of "program identifier"+"viewing time position".

Further, when metadata is available, the program identifier of the relevant EPG is used as metadata of the previewed program, thereby enabling the broadcast receiving apparatus 100 to timer-record a program easily associated with the EPG.

In metadata management, the efficiency of metadata creation can be improved in cooperation with the EPG such as by expressing the previewed program by means of a program identifier.

Moreover, by formulating the availability schedule based on the program scheduling information of the EPG in the metadata availability status DB 513, more flexible responses to the broadcast receiving apparatus 100 become possible, for example, by sending back an error message to a program of which metadata is determined not to be created at the time of request acceptance or by predetermining metadata availability information for a program of recorded broadcasting of which the scheduling has been fixed.

In this manner, the cooperation with the EPG server can yield similar advantages as in the first embodiment.

Fifth Embodiment

The fifth embodiment relates to an analyzing server for analyzing the metadata utilization state.

Figure 20:
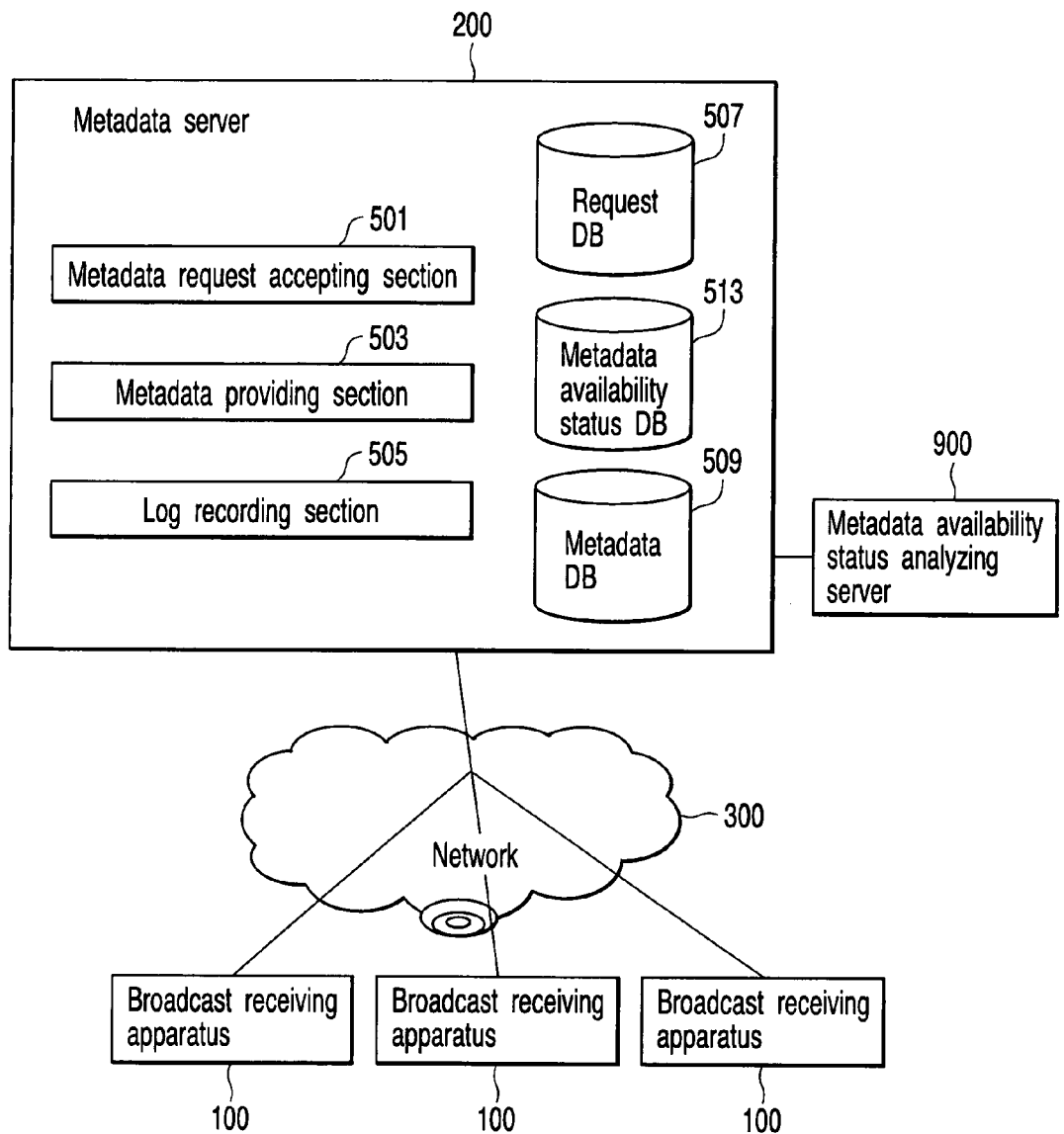
FIG. 20 is a view showing a metadata utilization state analyzing server according to a fifth embodiment.

As shown in FIG. 20, the metadata utilization state analyzing server 900 is connected to the metadata server 200. The metadata utilization state analyzing server 900 analyzes communication logs which are records of accesses to the metadata request accepting section 501 of the metadata server 200 from the broadcast receiving apparatus 100 and communication logs which are records of accesses to the metadata providing section 503 from the broadcast receiving apparatus 100.

Each communication log includes user information (IP address, user name, equipment name), and information such as receipt date, action channel, action time, action category, and subscribing EPG provider name. Based on this communication log information, for example, the analyzing server 900 analyzes the degree of the effectiveness of each program promotion by using the number of metadata requests or improves in particular the accuracy of the metadata information which users often wish to obtain when providing metadata, thereby enabling a more flexible operation.

According to the embodiments described above, metadata providers can create and provide metadata before preview broadcasting of a program of which metadata has not been prepared yet or at any timing after preview broadcasting. As a result thereof, the flexibility of metadata providing forms is kept high. In addition, providers can obtain marketing data of program promotion and consider the recovery and optimization of the cost of metadata provision by taking utilizing the data. For example, it is conceived to prepare and distribute metadata at the point of having received a certain number of metadata acquisition requests for a certain preview scene or to distribute metadata acquired by a lot of users also via broadcast wave. On the other hand, users have the merit of being able to use services based on metadata. By providing metadata as a key for program promotion viewing information, for example, by means of "viewing channel"+"viewing data" even if there is no metadata at the point of a user action, users can obtain desired results.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A metadata providing apparatus comprising:
a first receiving device configured to receive a first request for requesting metadata representing a broadcast schedule of a first program to be promoted during viewing of an already recorded second program that promotes the first program, the first request including viewing channel information and viewing time information of the second program;
an acquiring device configured to acquire the viewing time information of the second program based on the viewing channel information included in the first request;
an issuing device configured to issue a request ID with respect to the first request;
a first storage device to store the first request and the associated request ID;
a first sending device configured to send a request response including the request ID and a metadata available time range in response to the first request;
a second storage device to store metadata;
a second receiving device configured to receive a second request including the request ID and to request from the second storage device, only during the metadata available time range, metadata corresponding to the request ID; and
a second sending device configured to search the second storage device for metadata which is relevant to the request ID included in the second request, and send such metadata in response to the second request, wherein if the metadata which is relevant to the request ID is not found in the second storage device, the second sending device further sends a response including a location of an alternate metadata server to be accessed for requesting metadata.

2. The metadata providing apparatus according to claim 1, further comprising:
a recording device configured to record logs of accesses to the first receiving device or the second receiving device; and
an analyzing device configured to analyze the logs to calculate degree of effectiveness of program promotion obtained by the second program.

3. The metadata providing apparatus according to claim 1, further comprising:
a metadata request accepting server which includes the first receiving device; and
a metadata providing server which includes the second receiving device.

4. The metadata providing apparatus according to claim 1, wherein the first request includes a program identifier of the second program which promotes the first program and viewing time position information of the second program.

5. The metadata providing apparatus according to claim 4, further comprising:
a recording device configured to record logs of accesses to the first receiving device and the second receiving device; and
an analyzing device configured to analyze the logs to calculate degree of effectiveness of program promotion obtained by the second program.

6. The metadata providing apparatus according to claim 4, further comprising:
a metadata request accepting server which includes the first receiving device; and
a metadata providing server which includes the second receiving device.

7. A receiving apparatus, comprising:
a first generating device configured to generate a first request for requesting metadata representing a broadcast schedule of a first program to be promoted during viewing of an already recorded second program that promotes the first program, the first request including viewing channel information and viewing time information of the second program;
an acquiring device configured to acquire the viewing time information of the second program based on the viewing channel information included in the first request;
a first receiving device configured to receive a request response issued with respect to the first request, the request response including a request ID and metadata available time range;
a second generating device configured to generate a second request including the request ID and requesting metadata corresponding to the request ID; and
a second receiving device configured to receive the metadata relevant to the request ID included in the second request, and to try acquiring the metadata only in the metadata available time range, wherein if the metadata relevant to the request ID is not found, receiving a response including a location of an alternate metadata server to be accessed for requesting metadata.

8. The receiving apparatus according to claim 7, further comprising:
a timer-recording device configured to timer-record the first program by using the metadata received by the second receiving device.

9. A non-transitory computer-readable storage medium storing instructions which, when executed by a computer, perform a method of providing metadata, the method comprising:
receiving a first request for requesting metadata representing a broadcast schedule of a first program to be promoted during viewing of an already recorded second program that promotes the first program, the first request including viewing channel information and viewing time information of the second program;
acquiring the viewing time information of the second program based on the viewing channel information included in the first request;
issuing a request ID with respect to the first request;
storing the first request and the associated request ID in a first storage device;
sending a request response including the request ID and a metadata available range time in response to the first request;
storing metadata in a second storage device;
receiving a second request including the request ID and requesting from the second storage device, only during the metadata available time range, metadata corresponding to the request ID; and
searching the second storage device for metadata which is relevant to the request ID included in the second request, and sending such metadata in response to the second request, wherein if the metadata which is relevant to the request ID is not found in the second storage device, further sending a response including a location of an alternate metadata server to be accessed for requesting metadata.

* * * * *